United States Patent
Gill et al.

(10) Patent No.: US 12,082,616 B2
(45) Date of Patent: Sep. 10, 2024

(54) METHOD FOR OPERATING AN ELECTRONIC VAPOUR INHALER

(71) Applicant: JT International S.A., Geneva (CH)

(72) Inventors: Mark Gill, London (GB); Daniel Vanko, Watford (GB); Lubos Brvenik, Krpelany (SK)

(73) Assignee: JT International S.A. (CH)

( * ) Notice: Subject to any disclaimer, the term of this patent is extended or adjusted under 35 U.S.C. 154(b) by 205 days.

(21) Appl. No.: 17/345,639

(22) Filed: Jun. 11, 2021

(65) Prior Publication Data

US 2021/0307400 A1 Oct. 7, 2021

Related U.S. Application Data

(62) Division of application No. 15/768,330, filed as application No. PCT/GB2016/053168 on Oct. 13, 2016, now Pat. No. 11,033,056.

(30) Foreign Application Priority Data

Oct. 15, 2015 (GB) ...................................... 1518244

(51) Int. Cl.
| | |
|---|---|
| *A24F 40/465* | (2020.01) |
| *A24F 40/20* | (2020.01) |
| *A24F 40/50* | (2020.01) |
| *G05B 15/02* | (2006.01) |
| *H05B 6/06* | (2006.01) |

(52) U.S. Cl.
CPC ............ *A24F 40/465* (2020.01); *A24F 40/50* (2020.01); *G05B 15/02* (2013.01); *H05B 6/06* (2013.01); *A24F 40/20* (2020.01)

(58) Field of Classification Search
CPC ......... A24F 40/465; A24F 40/46; A24F 40/20
See application file for complete search history.

(56) References Cited

U.S. PATENT DOCUMENTS

| | | | |
|---|---|---|---|
| 6,040,560 A | 3/2000 | Fleischhauer et al. | |
| 2003/0150451 A1 | 8/2003 | Shayan | |

(Continued)

FOREIGN PATENT DOCUMENTS

| | | |
|---|---|---|
| CN | 103237468 A | 8/2013 |
| CN | 103608619 A | 2/2014 |

(Continued)

OTHER PUBLICATIONS

Search Report dated Mar. 27, 2022 from the Office Action for Chinese Application No. 2016800713114 issued Apr. 2, 2022, 1 pg.

(Continued)

*Primary Examiner* — Christopher M Rodd
*Assistant Examiner* — Jennifer A Kessie
(74) *Attorney, Agent, or Firm* — Lerner David LLP

(57) ABSTRACT

A method is provided for operating an electronic vapour inhaler comprising an induction heating arrangement, the induction heating arrangement comprising an induction coil for generating an alternating electromagnetic field to heat an induction heatable element and thereby heat a non-liquid flavour-release medium. The method comprises intermittently energising the induction coil to generate an intermittent alternating electromagnetic field which provides pulsed heating and cooling of the induction heatable element.

19 Claims, 2 Drawing Sheets

(56) References Cited

U.S. PATENT DOCUMENTS

| | | | |
|---|---|---|---|
| 2005/0000959 A1 | 1/2005 | Kagan | |
| 2007/0102013 A1 | 5/2007 | Adams et al. | |
| 2013/0340750 A1 | 12/2013 | Thorens et al. | |
| 2014/0096781 A1* | 4/2014 | Sears | A24F 40/50 |
| | | | 131/328 |
| 2014/0123990 A1 | 5/2014 | Timmermans | |
| 2014/0216485 A1 | 8/2014 | Egoyants et al. | |
| 2014/0278250 A1 | 9/2014 | Smith et al. | |
| 2015/0216237 A1 | 8/2015 | Wensley et al. | |
| 2015/0245669 A1 | 9/2015 | Cadieux et al. | |
| 2016/0021934 A1* | 1/2016 | Cadieux | A24F 40/465 |
| | | | 131/328 |
| 2017/0086508 A1* | 3/2017 | Mironov | A24C 5/01 |

FOREIGN PATENT DOCUMENTS

| | | |
|---|---|---|
| CN | 104095295 A | 10/2014 |
| EP | 2856893 A1 | 4/2015 |
| EP | 2875740 A2 | 5/2015 |
| JP | 2009509523 A | 3/2009 |
| JP | 2013545474 A | 12/2013 |
| WO | 9527411 A1 | 10/1995 |
| WO | 2013034455 A1 | 3/2013 |
| WO | 2014023965 A1 | 2/2014 |
| WO | 2014048745 A1 | 4/2014 |
| WO | 2014102091 A1 | 7/2014 |
| WO | 2014120479 A1 | 8/2014 |
| WO | 2015131058 A1 | 9/2015 |
| WO | 2015175568 A1 | 11/2015 |

OTHER PUBLICATIONS

International Search Report for Application No. PCT/GB2016/053168 dated Mar. 2, 2017, 3 pages.
Tipler, p. A et al., "Physics for Scientists and Engineers" Fifth Edition, Extended Version, Aug. 2003, W. H. Freeman, pp. 1-4.
Sirius, J. "Studying the Vaporizer: Insight into Proper Vape Use" High Times, Mar. 2015, pp. 1-16.
Wikipedia, The Free Encyclopedia, Propylene glycol, Sep. 2015, pp. 1-4.
YouTube video, " https://www.youtube.com/watch?v=OXc715ZVEl", pp. 1-4, uploaded on Jul. 19, 24.
YouTube video, " https://www.youtube.com/watch?v=AV7VcFM6y_g" pp. 1-3, uploaded on Jul. 19, 24 by user " Todds".
Communication of a notice of opposition, for Application No. 16788745.4, dated Jun. 5, 2024, pp. 1-42.

* cited by examiner

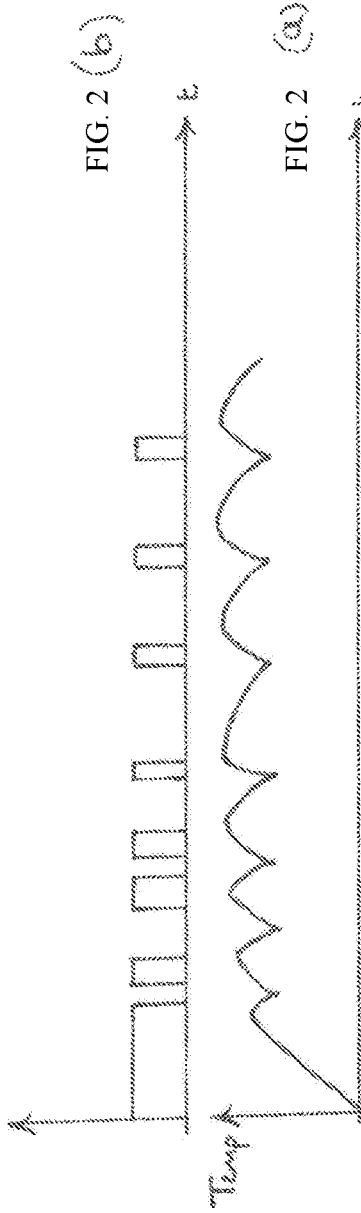
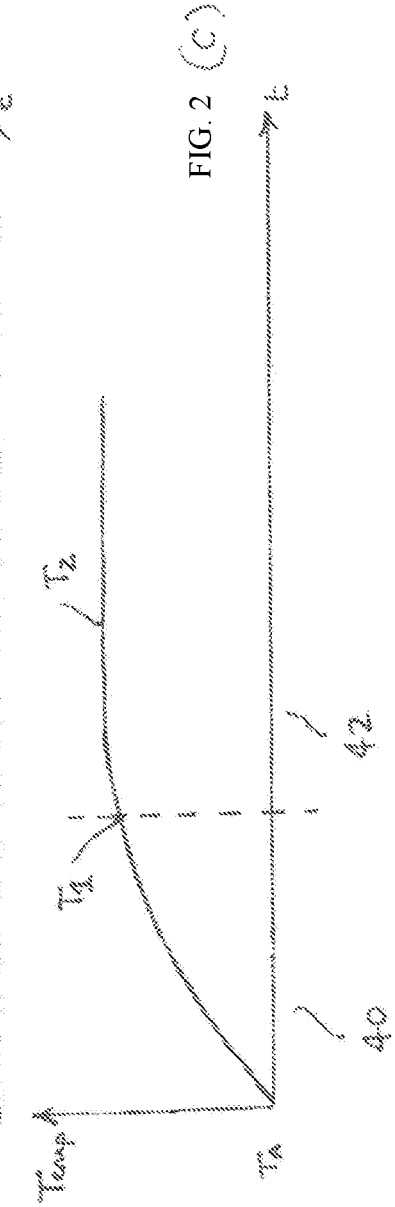

METHOD FOR OPERATING AN ELECTRONIC VAPOUR INHALER

CROSS-REFERENCE TO RELATED APPLICATIONS

This application is a divisional of U.S. application Ser. No. 15/768,330, which is a national phase entry under 35 U.S.C. § 371 of International Application No. PCT/GB2016/053168, filed Oct. 13, 2016, which claims priority from Great Britain Application No. 1518244.7 filed on Oct. 15, 2015, the disclosures of which are incorporated herein by reference.

TECHNICAL FIELD

The present disclosure relates generally to electronic vapour inhalers and more particularly to a method for operating an electronic vapour inhaler in which a non-liquid flavour-release medium is heated to produce a vapour for inhalation by a user.

TECHNICAL BACKGROUND

The use of electronic vapour inhalers (also known as electronic cigarettes, e-cigarettes and personal vaporisers), which can be used as an alternative to conventional smoking articles such as lit-end cigarettes, cigars, and pipes, is becoming increasingly popular and widespread. The most commonly used electronic vapour inhalers are usually battery powered and use a resistance heating element to heat and atomise a liquid containing nicotine, to produce a nicotine-containing vapour which can be inhaled by a user. The vapour is inhaled through a mouthpiece to deliver nicotine to the lungs, and vapour exhaled by the user generally mimics the appearance of smoke from a conventional smoking article. Although inhalation of the vapour creates a physical sensation which is similar to conventional smoking, harmful chemicals such as carbon dioxide and tar are not produced or inhaled because there is no combustion.

In the conventional e-cigarettes described above, the liquid is wicked onto the resistance heating element. This provides rapid atomisation of the liquid, and hence rapid start-up of the e-cigarette following activation by a user, but the flavour can be sub-optimal. A conventional tobacco material or other non-liquid flavour-release medium can be used instead of a liquid in order to provide improved flavour characteristics. However, the start-up period (in other words the "time to first puff") after initial activation of the e-cigarette by the user is longer because more time is needed to heat the tobacco material or other non-liquid flavour-release medium to a temperature at which a satisfactory amount of vapour is produced. This is due to the higher thermal mass of the resistance heating element which has a slow response.

WO 2014/102091 proposes a solution to this problem by providing a resistance-heated aerosol-generating device which has three heating phases. In particular, there is a first phase during which the temperature of the heating element is raised from ambient temperature to a first temperature, a second phase during which the temperature of the heating element drops below the first temperature and a third phase during which the temperature of the heating element increases again. The first phase is a high-temperature phase in which the temperature of the heating element is raised as close as possible to the combustion temperature of an aerosol-forming substrate used in the device. The second phase is a lower-temperature phase in which the temperature of the heating element is reduced to provide a continued delivery of aerosol to the user. The third phase is also a high-temperature phase which aims to provide a continued delivery of aerosol to the user as the aerosol-forming substrate becomes depleted.

WO 2014/102091 indicates that the preferred temperature range for the first phase is between 340° C. and 400° C., and provides specific examples of 360° C. for 45 seconds, 340° ° C. for 60 seconds and 380° C. for 30 seconds. WO 2014/102091 explains that the maximum operating temperature of any of the first, second and third phases is preferably no more than approximately 380° C., which is stated to be the combustion temperature for undesirable compounds that are present in conventional, lit-end cigarettes. It is, therefore, apparent that the temperature of the heating element during the first phase is very high and close to the maximum allowable temperature for a relatively extended period. This may cause charring of the aerosol-forming substrate and would be highly undesirable as it produces an aerosol with an unpleasant or 'off' taste. This may also begin to generate the undesirable compounds that are generated in conventional, lit-end cigarettes, as a result of combustion. Furthermore, even at the very high temperatures described in WO 2014/102091, the start-up period is still unacceptably long especially when compared to the instantaneous availability of a lit-end cigarette or an e-cigarette which heats and atomises a liquid.

There is, therefore, a need for an electronic vapour inhaler which overcomes these difficulties.

SUMMARY OF THE DISCLOSURE

According to a first aspect of the present disclosure, there is provided a method for operating an electronic vapour inhaler comprising an induction heating arrangement, the induction heating arrangement comprising an induction coil for generating an alternating electromagnetic field to heat an induction heatable element and thereby heat a non-liquid flavour-release medium, the method comprising intermittently energising the induction coil to generate an intermittent alternating electromagnetic field which provides pulsed heating and cooling of the induction heatable element.

According to a second aspect of the present disclosure, there is provided an electronic vapour inhaler comprising:
 an induction heating arrangement, the induction heating arrangement comprising an induction coil for generating an alternating electromagnetic field to heat an induction heatable element and thereby heat a non-liquid flavour-release medium; and
 a control arrangement for controlling the operation of the induction heating arrangement to intermittently energise the induction coil to generate an intermittent alternating electromagnetic field which provides pulsed heating and cooling of the induction heatable element.

The non-liquid flavour-release medium may comprise any material or combination of materials which can be heated to release a vapour for inhalation by a user. The non-liquid flavour-release medium is a dry material and can be easily handled. The non-liquid flavour-release medium may be tobacco or a tobacco material or a dry herbal material. The non-liquid flavour-release medium could take any suitable form, including fine pieces or pellets or a fibrous form. The non-liquid flavour-release medium may be impregnated with a vapour-forming medium such as propylene glycol, glycerol or a combination thereof.

The induction heatable element has a low thermal mass and can, therefore, be heated rapidly in the presence of the alternating electromagnetic field generated by the induction coil of the induction heating arrangement. The induction heatable element may, for example, be heated from ambient temperature to approximately 250° C. in 0.2 seconds. The low thermal mass also allows the induction heatable element to rapidly cool in the absence of the alternating electromagnetic field, as the heat energy is transferred into the surrounding non-liquid flavour-release medium. By intermittently energising the induction coil to provide an intermittent alternating electromagnetic field, and hence intermittent or pulsed heating and cooling of the induction heatable element, a large amount of energy can be delivered to the induction heatable element without burning or overheating the non-liquid flavour-release medium. As a result of heat transfer from the induction heatable element to the non-liquid flavour-release medium, for example by conduction, radiation and convection, the non-liquid flavour-release medium, or at least one or more localised regions thereof, can be rapidly heated to a temperature within an operating temperature range at which a vapour is generated having suitable characteristics (including flavour and aroma) for inhalation by a user. The intermittent or pulsed heating and cooling of the induction heatable element combined with the low thermal mass of the induction heatable element ensures that the non-liquid flavour-release medium does not reach a temperature above the operating temperature range at which overheating, burning or charring occur and enables the non-liquid flavour-release medium to be heated rapidly to a temperature in the operating temperature range.

The method may comprise varying the pulse frequency of the power supplied to the induction coil to intermittently energise the induction coil. The method may comprise varying the pulse amplitude of the power supplied to the induction coil to intermittently energise the induction coil. The method may comprise varying the duty cycle of the power supplied to the induction coil to intermittently energise the induction coil. Controlling the pulse frequency and/or the pulse amplitude and/or the duty cycle provides control over the pulsed heating and cooling of the induction heatable element and therefore allows the operating temperature of the non-liquid flavour-release medium to be controlled.

The pulsed heating and cooling of the induction heatable element may heat the non-liquid flavour-release medium to an operating temperature in an operating temperature range having a lower limit of between 150° C. and 200° C. and an upper limit of between 200° C. and 250° C. Typically, the operating temperature range is between 180° ° C. and 240° C. In the case where the non-liquid flavour-release medium is a tobacco material which might typically have a combustion temperature in the region of 380° C., it will be apparent that the upper limit of the operating temperature range is substantially lower than the combustion temperature. As a consequence, charring and burning of the tobacco material is avoided and this ensures that the vapour generated by heating the tobacco material has optimum characteristics.

The method may comprise a first operating phase in which the induction coil is intermittently energised to generate an intermittent alternating electromagnetic field which provides pulsed heating and cooling of the induction heatable element to heat the non-liquid flavour-release medium to a temperature in the operating temperature range. The first operating phase may have a duration which typically does not exceed 10 seconds. More typically, the duration does not exceed 5 seconds. Thus, it will be apparent that the start-up time (in other words the "time to first puff") is significantly less than that of the aerosol-generating device described in WO 2014/102091.

The method may comprise a second operating phase in which the induction coil is intermittently energised to generate an intermittent alternating electromagnetic field which provides pulsed heating and cooling of the induction heatable element to maintain the average temperature of the non-liquid flavour-release medium within the operating temperature range. The strength of the alternating electromagnetic field is typically lower during the second operating phase than during the first operating phase. This is possible because the component parts of the electronic vapour inhaler have already been heated up during the first operating phase and because the amount of moisture and vapour-forming medium in the non-liquid flavour-release medium has decreased. Thus, less energy is needed to maintain the average temperature of the non-liquid flavour-release medium within the operating temperature range.

During the second operating phase, the induction coil may be intermittently energised based on user demand. Such an implementation is possible again because of the low thermal mass and rapid heating and cooling characteristics of the induction heatable element which enable the induction heatable element to be rapidly heated in the presence of the electromagnetic field and to rapidly cool in the absence of the electromagnetic field. The user demand may be detected by any suitable means which are indicative that inhalation by a user of the electronic vapour inhaler is taking place or is imminent. For example, the electronic vapour inhaler could include an accelerometer to detect movement thereof by a user towards the lips, a capacitive sensor to detect contact with the lips or a flowmeter or flow-switch to detect actual inhalation by a user.

The induction coil may be intermittently energised according to a predetermined heating profile. The predetermined heating profile may be selectable by a user, for example in real-time via a wireless (e.g. Bluetooth®) communication interface. The predetermined heating profile may be selected automatically, for example based on a detected characteristic which is related to the non-liquid flavour-release medium.

The electronic vapour inhaler may comprise a plurality of induction heatable elements. The number of induction heatable elements can be selected to provide for optimum heating of the non-liquid flavour-release medium.

BRIEF DESCRIPTION OF THE DRAWINGS

FIG. 2a is a schematic illustration of a pulsed heating profile in an induction heatable element illustrating the intermittent heating and cooling of the induction heatable element;

FIG. 2b is a schematic illustration of the intermittent operation of an induction coil which generates the pulsed heating profile of FIG. 2a; and FIG. 2c is a schematic illustration of the average operating temperature of a non-liquid flavour-release medium provided by the pulsed heating profile of FIG. 2a.

DETAILED DESCRIPTION OF THE EMBODIMENTS

Figure 1:
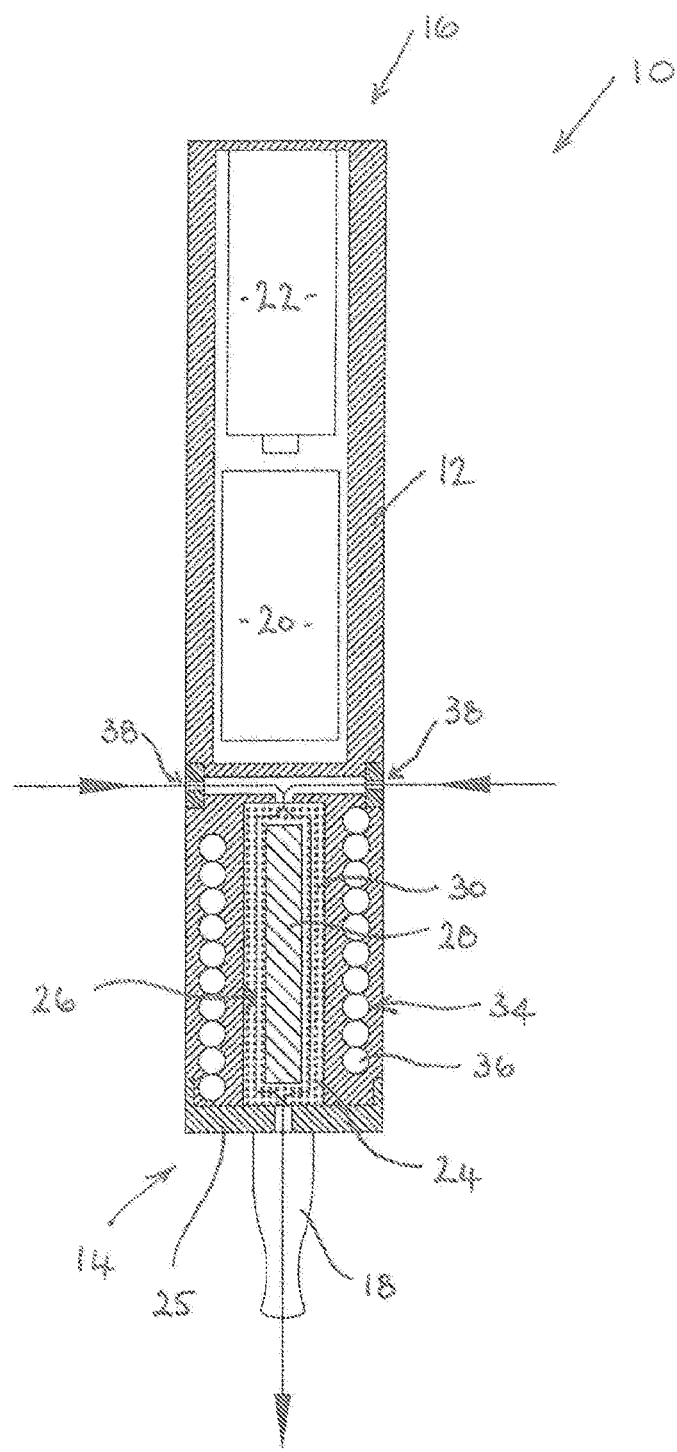
FIG. 1 is diagrammatic cross-sectional view of one example of an electronic vapour inhaler which can be operated in accordance with the method of the present disclosure.

Embodiments of the present disclosure will now be described by way of example only and with reference to the accompanying drawings.

Referring initially to FIG. 1, an electronic vapour inhaler 10 comprises a generally elongate housing 12 having a proximal end 14 and a distal end 16. The electronic vapour inhaler 10 includes a mouthpiece 18 at the proximal end 14 through which a user can inhale vapour generated by heating a non-liquid flavour-release medium 30. The electronic vapour inhaler 10 includes a control arrangement 20, e.g. in the form of a microprocessor, and a power source 22 in the form of one or more batteries which could, for example, be inductively rechargeable.

The housing 12 includes a chamber 24 containing the non-liquid flavour-release medium 30. The chamber 24 is located at the proximal end 14 of the housing 12 adjacent to the mouthpiece 18, but this is not strictly necessary and it could be located at any suitable position between the proximal end 14 and the distal end 16. In the illustrated embodiment, the chamber 24 is formed in the housing 12 and is accessed by removing a cover 25, with which the mouthpiece 18 is integrally formed, from the proximal end 14 of the housing 12. In alternative embodiments, the chamber 24 could itself be formed as a removable component and could be accessed by removing the component from the housing 12.

In the illustrated embodiment, the non-liquid flavour-release medium 30 is embodied as a cartridge 26 which can be removably inserted into the chamber 24. The cartridge 26 comprises an elongate induction heatable element 28 and the non-liquid flavour-release medium 30 which can be adhered or otherwise fixed to the surface of the induction heatable element 28. It is to be understood that the embodiment of the electronic vapour inhaler 10 illustrated in FIG. 1 is provided merely as an example to facilitate the description of the method of operation according to the present disclosure. Other arrangements are entirely within the scope of the present disclosure, for example arrangements which use a plurality of induction heatable elements, in which the or each induction heatable element has a different geometry, in which the cartridge 26 is replaced by an air-permeable capsule containing the non-liquid flavour-release medium 30 and one or more induction heatable elements 28, etc.

The non-liquid flavour-release medium 30 typically comprises tobacco material, but other non-liquid flavour-release products can be used. The non-liquid flavour-release medium 30 is typically impregnated with a vapour-forming medium, such as propylene glycol, glycerol or a combination of both, and when heated to a temperature within an operating temperature range produces a vapour for inhalation by a user through the mouthpiece 18 of the electronic vapour inhaler 10.

The electronic vapour inhaler 10 includes an induction heating arrangement 34 comprising an induction coil 36 which can be energised by the power source 22. As will be understood by those skilled in the art, when the induction coil 36 is energised, an alternating electromagnetic field is produced which generates eddy currents in the induction heatable element 28 causing it to heat up. The heat is then transferred from the induction heatable element 28 to the non-liquid flavour-release medium 30, for example by conduction, radiation and convection, and the non-liquid flavour-release medium 30 is thereby heated. The operation of the induction heating arrangement 34 is controlled by the control arrangement 20 and will now be described in further detail.

Referring to FIGS. 2a to 2c, upon activation of the electronic vapour inhaler 10 by a user, the control arrangement 20 causes the induction heating arrangement 34, and more particularly the induction coil 36, to be intermittently energised by the power source 22. This intermittent, or pulsed, operation is represented by the 'on' and 'off' pulses which are shown clearly in FIG. 2b. This intermittent, or pulsed, operation causes the induction coil 36 to generate an intermittent, or pulsed, alternating electromagnetic field which in turn provides pulsed heating and cooling of the induction heatable element 28. The pulsed heating and cooling of the induction heatable element 28 is clearly shown in FIG. 2a which illustrates the varying temperature over time of the induction heatable element 28. The characteristics of the pulsed heating and cooling can be influenced by controlling the pulse frequency of the power supplied to the induction coil 36 (in other words the number and/or length of pulses in a given time period), for example as shown in FIG. 2b. Alternatively or in addition, the characteristics of the pulsed heating and cooling can be influenced by controlling the pulse amplitude of the power supplied to the induction coil 36 and/or by varying the duty cycle of the power supplied to the induction coil 36.

The pulsed heating and cooling of the induction heatable element 28 as depicted in FIG. 2a rapidly heats the non-liquid flavour-release medium 30, and especially localised regions thereof, from ambient temperature $T_A$ to an operating temperature $T_1$ (see FIG. 2c) which is typically between 180° C. and 220° C. This operating temperature $T_1$ is significantly lower than the combustion temperature of typical tobacco material (approx. 380° C.) and ensures that there is no overheating, charring or burning of the tobacco material.

The control arrangement 20 can be configured to maintain the pulsed heating and cooling of the induction heatable element 28 (by intermittently energising the induction coil 36) throughout the period of use of the electronic vapour inhaler 10 until such time as it is deactivated by the user. This deactivation may, for example, occur when the constituents of the non-liquid flavour-release medium 30 have been depleted and the resulting vapour no longer has acceptable characteristics such as flavour and aroma.

Referring to FIG. 2c, the pulsed heating and cooling of the induction heatable element 28 to achieve the operating temperature $T_1$ occurs during a first operating phase 40 following activation of the electronic vapour inhaler 10. This first operating phase 40 can be considered to represent a start-up phase in which initial heating of the non-liquid flavour-release medium 30 occurs to make the electronic vapour inhaler 10 ready for use and, thus, in which the temperature of at least localised regions of the non-liquid flavour-release medium 30 is increased from ambient temperature $T_A$ to a temperature at which a vapour suitable for inhalation by a user is generated. After the end of the first operating phase 40, the average temperature of the non-liquid flavour-release medium 30 continues to increase at the start of a second operating phase 42 until it reaches a higher temperature $T_2$. A typical duration of the first operating phase 40 is less than 10 seconds, and more typically in the region of 5 seconds or less. It will be appreciated that this heating is much more rapid than the heating provided during the first phase of operation of the device described in WO 2014/102091 (between 30 and 60 seconds) such that the start-up time is more rapid and, hence, the 'time to first puff' is as short as possible.

During the second operating phase 42, the control arrangement 20 can reduce the energy supplied by the power source 22 to the induction coil 36 to reduce the strength of the electromagnetic field and to thereby reduce the temperature of the induction heatable element 28. This is possible because the component parts of the electronic vapour inhaler 10 have been heated during the first operating phase 40 and because the amount of moisture and vapour-forming medium in the non-liquid flavour-release medium 30 have decreased. Thus, the non-liquid flavour-release medium 30 can be maintained at the average operating temperature $T_2$ even with a lower energy input into the induction coil 36. In the second operating phase 42 illustrated in FIG. 2c, the operating temperature $T_2$ of the non-liquid flavour-release medium 30 is shown to remain relatively constant. However, the operating temperature of the non-liquid flavour-release medium 30 could increase or decrease during the second operating phase 42 to ensure that an acceptable flavour and aroma continues to be delivered to the user.

In one embodiment, during the second operating phase 42 the control arrangement 20 controls the amount of energy transferred to the non-liquid flavour-release medium 30, by varying the pulse ratio of the power source 22 to the induction coil 36, based on user demand. More particularly, the electronic vapour inhaler 10 can comprise means for detecting when inhalation by a user is imminent or actually taking place. For example, the electronic vapour inhaler 10 could comprise an accelerometer for detecting movement by a user towards their lips, a capacitive sensor (so-called lip detector) fitted to the mouthpiece 18 to detect when the mouthpiece comes into contact with a user's lips, or a flowmeter/flow-switch to detect when a user is actually inhaling through the mouthpiece 18. It will be understood that these detection means are merely provided by way of example and that other detection means are entirely within the scope of the present disclosure.

In this embodiment, when the control arrangement 20 receives a signal from the detection means indicating that inhalation by a user is imminent or actually taking place, the control arrangement 20 increases the energy supplied by the power source 22 to the induction coil 36. This raises the temperature of the induction heatable element 28 and in turn increases the temperature of the non-liquid flavour-release medium 30. Once again, the control arrangement 20 is configured to cause the induction coil 36 to be intermittently energised by the power source 22 upon receipt of a signal from the detection means. This causes the induction coil 36 to generate an intermittent alternating electromagnetic field which in turn provides pulsed heating and cooling of the induction heatable element 28.

If desired, the induction coil 36 can be intermittently energised (during the first operating phase 40 and/or the second operating phase 42) according to a predetermined heating profile. The predetermined heating profile could be selected by a user, for example to provide for higher or lower operating temperatures depending on the preference of the user and/or the characteristics of the non-liquid flavour-release medium 30. Alternatively or in addition, the predetermined heating profile could be selected automatically based on a detected characteristic which is related to the non-liquid flavour-release medium 30.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

Any combination of the above-described features in all possible variations thereof is encompassed by the present invention unless otherwise indicated herein or otherwise clearly contradicted by context.

The invention claimed is:

1. An electronic vapour inhaler comprising:
   an induction heating arrangement, the induction heating arrangement comprising an induction coil for generating an alternating electromagnetic field to heat an induction heatable element and thereby heat a non-liquid flavour-release medium; and
   a control arrangement including a microprocessor for controlling operation of the induction heating arrangement to intermittently energize the induction coil to generate an intermittent alternating electromagnetic field which provides pulsed heating and cooling of the induction heatable element such that the pulsed heating and cooling of the induction heatable element heats the non-liquid flavour-release medium to an operating temperature in an operating temperature range having a lower limit of between about 150° C. and about 200° C. and an upper limit of between about 200° C. and about 250° C.

2. The vapour inhaler according to claim 1, wherein the control arrangement is arranged to vary pulse frequency of power supplied to the induction coil.

3. The vapour inhaler according to claim 1, wherein the control arrangement is arranged to vary pulse amplitude of power supplied to the induction coil.

4. The vapour inhaler according to claim 1, wherein the control arrangement is arranged to vary a duty cycle of power supplied to the induction coil.

5. The vapour inhaler according to claim 1, wherein the operating temperature range is between about 180° C. and about 240° C.

6. The vapour inhaler according to claim 1, wherein during a first operating phase, the induction coil is intermittently energised to generate the intermittent alternating electromagnetic field which provides the pulsed heating and cooling of the induction heatable element to heat the non-liquid flavour-release medium to a temperature in the operating temperature range.

7. The vapour inhaler according to claim 6, wherein the first operating phase has a predetermined duration.

8. The vapour inhaler according to claim 7, wherein the duration of the first operating phase does not exceed 10 seconds.

9. The vapour inhaler according to claim 6, wherein the control arrangement is arranged to intermittently energize the induction coil during a second operating phase to generate an intermittent alternating electromagnetic field which provides pulsed heating and cooling of the induction heatable element to maintain an average temperature of the non-liquid flavour-release medium within the operating temperature range.

10. The vapour inhaler according to claim 9, wherein a strength of the alternating electromagnetic field is lower during the second operating phase than during the first operating phase.

11. The vapour inhaler according to claim 9, wherein the control arrangement is arranged to intermittently energize the induction coil, during the second operating phase, based on user demand.

12. The vapour inhaler according to claim 1, wherein the control arrangement is arranged to intermittently energize the induction coil according to a predetermined heating profile.

13. The vapour inhaler according to claim 12, wherein the predetermined heating profile is selectable by a user.

14. The vapour inhaler according to claim 12, wherein the predetermined heating profile is selected automatically based on a detected characteristic which is related to the non-liquid flavour-release medium.

15. An electronic vapour inhaler comprising:
   an induction heating arrangement, the induction heating arrangement comprising an induction coil for generating an alternating electromagnetic field to heat an induction heatable element and thereby heat a non-liquid flavour-release medium; and
   a control arrangement including a microprocessor for controlling operation of the induction heating arrangement to intermittently energize the induction coil during a first operating phase and during a second operating phase,
   wherein, during the first operating phase, the induction coil is intermittently energised to generate an intermittent alternating electromagnetic field which provides pulsed heating and cooling of the induction heatable element to heat the non-liquid flavour-release medium to a temperature in an operating range having a lower limit of between about 150° C. and about 200° ° C. and an upper limit of between about 200° C. and about 250° C.,
   wherein, during the second operating phase, the induction coil is intermittently energised to generate an intermittent alternating electromagnetic field which provides pulsed heating and cooling of the induction heatable element to maintain an average temperature of the non-liquid flavour-release medium within the operating range, and
   wherein, during the second operating phase, the induction coil is intermittently energised based on user demand to increase the temperature of the induction heatable element.

16. The vapour inhaler claim 15, further comprising an accelerometer configured to determine the user demand.

17. The vapour inhaler of claim 15, further comprising a capacitive sensor configured to determine the user demand prior to inhalation by a user.

18. An electronic vapour inhaler comprising:
   an induction heating arrangement, the induction heating arrangement comprising an induction coil for generating an alternating electromagnetic field to heat an induction heatable element and thereby heat a non-liquid flavour-release medium; and
   a control arrangement including a microprocessor for controlling operation of the induction heating arrangement to intermittently energize the induction coil with pulses of varying length during a first operating phase to generate an intermittent alternating electromagnetic field which provides pulsed heating and cooling of the induction heatable element such that the pulsed heating and cooling of the induction heatable element heats the non-liquid flavour-release medium to an operating temperature in an operating temperature range having a lower limit of between about 150° C. and about 200° C. and an upper limit of between about 200° C. and about 250° C.

19. The vapour inhaler of claim 18, wherein during a second operating phase, the induction coil is intermittently energised to generate the intermittent alternating electromagnetic field which provides the pulsed heating and cooling of the induction heatable element to maintain an average temperature of the non-liquid flavour-release medium within the operating temperature range.

\* \* \* \* \*